United States Patent [19]
Fitzsimmons et al.

[11] Patent Number: 5,515,967
[45] Date of Patent: May 14, 1996

[54] CD-ROM RETAILER

[76] Inventors: W. Tyler Fitzsimmons, 22 Ocean View Ave., South Portland, Me. 04106; Anthony L. Gelardi, P.O. Box 213, Cape Porpoise, Me. 04104

[21] Appl. No.: 331,760

[22] Filed: Oct. 31, 1994

[51] Int. Cl.$^6$ ................................................ B65D 85/57
[52] U.S. Cl. ............................. 206/307.1; 206/308.1; 206/308.3
[58] Field of Search ........................... 206/307, 307.1, 206/308.1, 308.2, 308.3, 311, 387.13, 472, 473, 474, 475

[56] References Cited

U.S. PATENT DOCUMENTS

| | | |
|---|---|---|
| 4,511,034 | 4/1985 | Pan . |
| 4,635,797 | 1/1987 | Bankier . |
| 4,640,413 | 2/1987 | Kaplan et al. . |
| 4,793,477 | 12/1988 | Manning et al. . |
| 4,805,769 | 2/1989 | Soltis et al. ............ 206/308.2 X |
| 4,828,105 | 5/1989 | Silengo et al. . |
| 4,869,364 | 9/1989 | Bray . |
| 4,899,879 | 2/1990 | Rosen . |
| 4,977,483 | 12/1990 | Peretta . |
| 5,207,717 | 5/1993 | Manning . |
| 5,248,037 | 9/1993 | Kornberg et al. . |
| 5,249,670 | 10/1993 | Simon . |
| 5,267,647 | 12/1993 | Stumpff et al. ............ 206/308.1 |
| 5,285,893 | 2/1994 | Misterka et al. . |

FOREIGN PATENT DOCUMENTS 405112383  5/1993  Japan .

*Primary Examiner*—Jacob K. Ackun
*Attorney, Agent, or Firm*—James Creighton Wray

[57] ABSTRACT

A plastic package for storing and selling at retail holds compact discs and accompanying 3.5" diskettes and literature. The container has two parts, a frame and a window. The frame, which is one molded piece, has a cover and a tray connected by a living hinge to form a book-like display. The tray has an opening in the base. Grippers positioned around the base retain a Jewel box inside the opening for external visual recognition. A hinged, foldable 3.5" diskette holder with a spring for securing multiple diskettes is connected by a second living hinge to the bottom wall of the tray. In an inward position, the holder extends along the base below the opening. A flap hinged to the base between the opening and the holder secures the Jewel box. A tab on the holder rests underneath an extension of the flap when the flap extends inward, perpendicular to the base. The flap/tab connection is strong and requires a screwdriver or coin to release. The cover has a clear window which extends around the top and inner side of the cover to entrap an L-shaped graphics card that display the front cover and spine graphics. A flexible retaining arm is molded to the cover for holding printed material. The cover and tray are held closed by a latch/aperture connection. The latch is molded as part of the tray and rests in a position perpendicular to the base of the tray. Once engaging the aperture, the latch can only be released by applying inward pressure to the top or side of the latch.

57 Claims, 12 Drawing Sheets

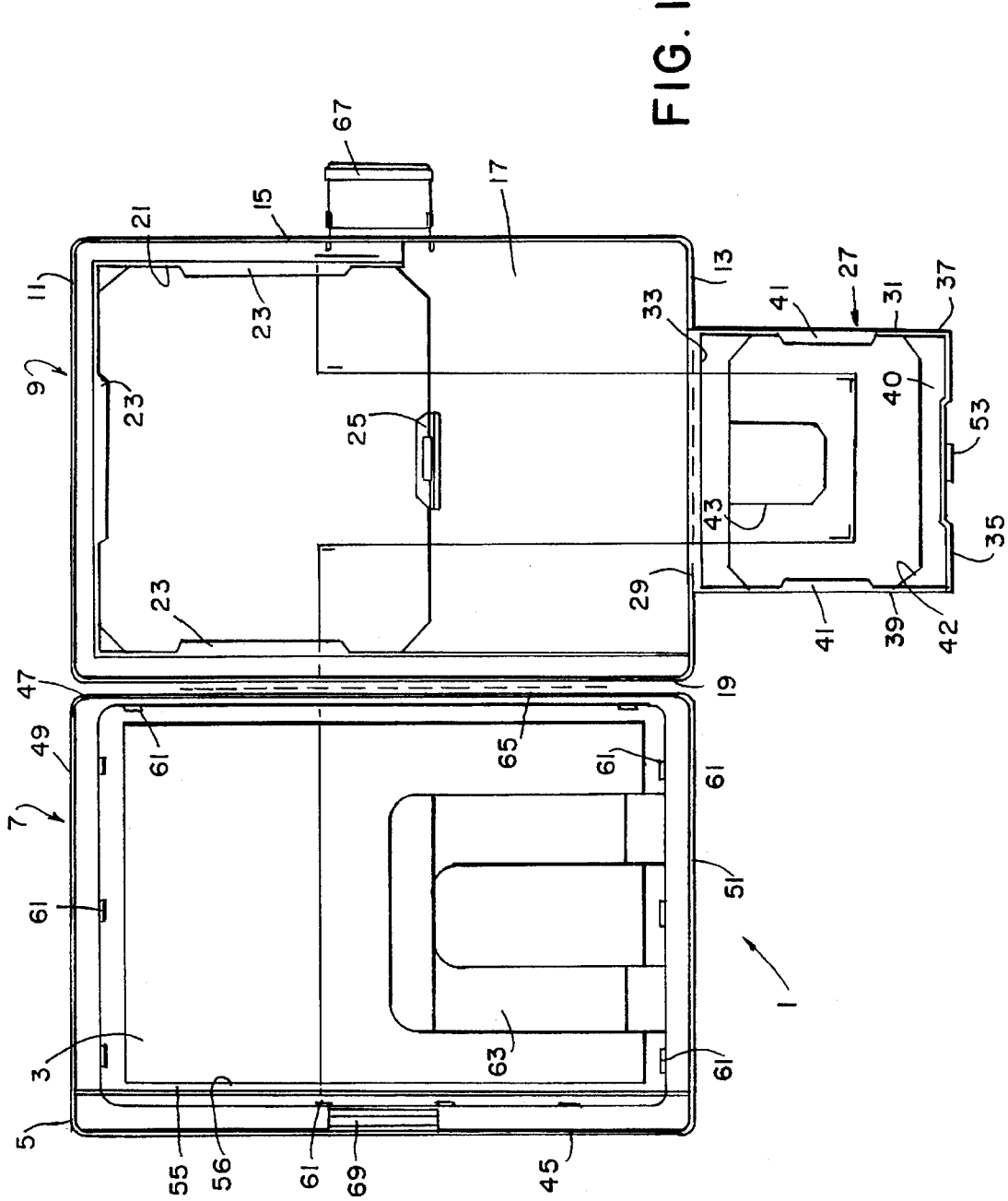

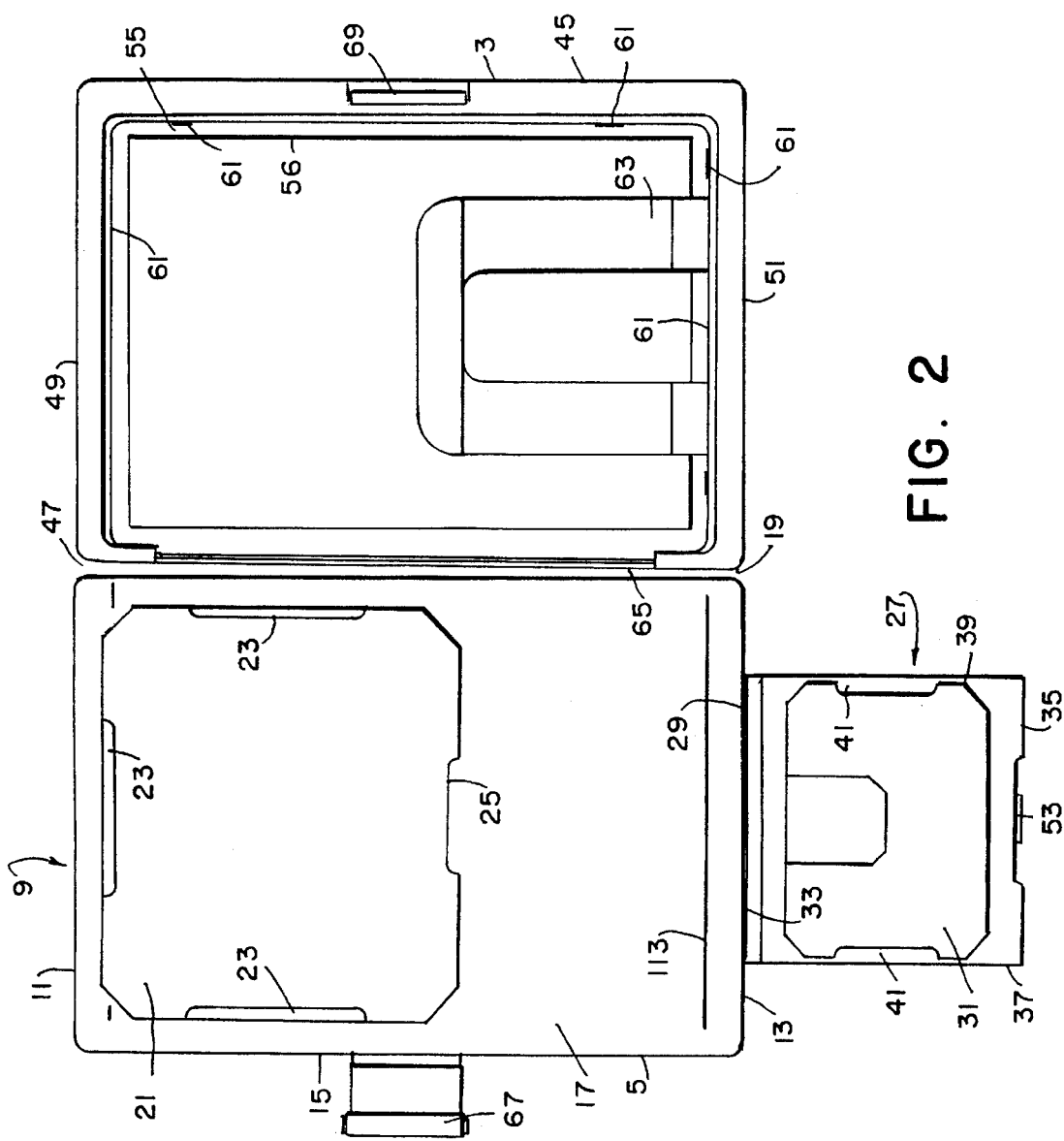

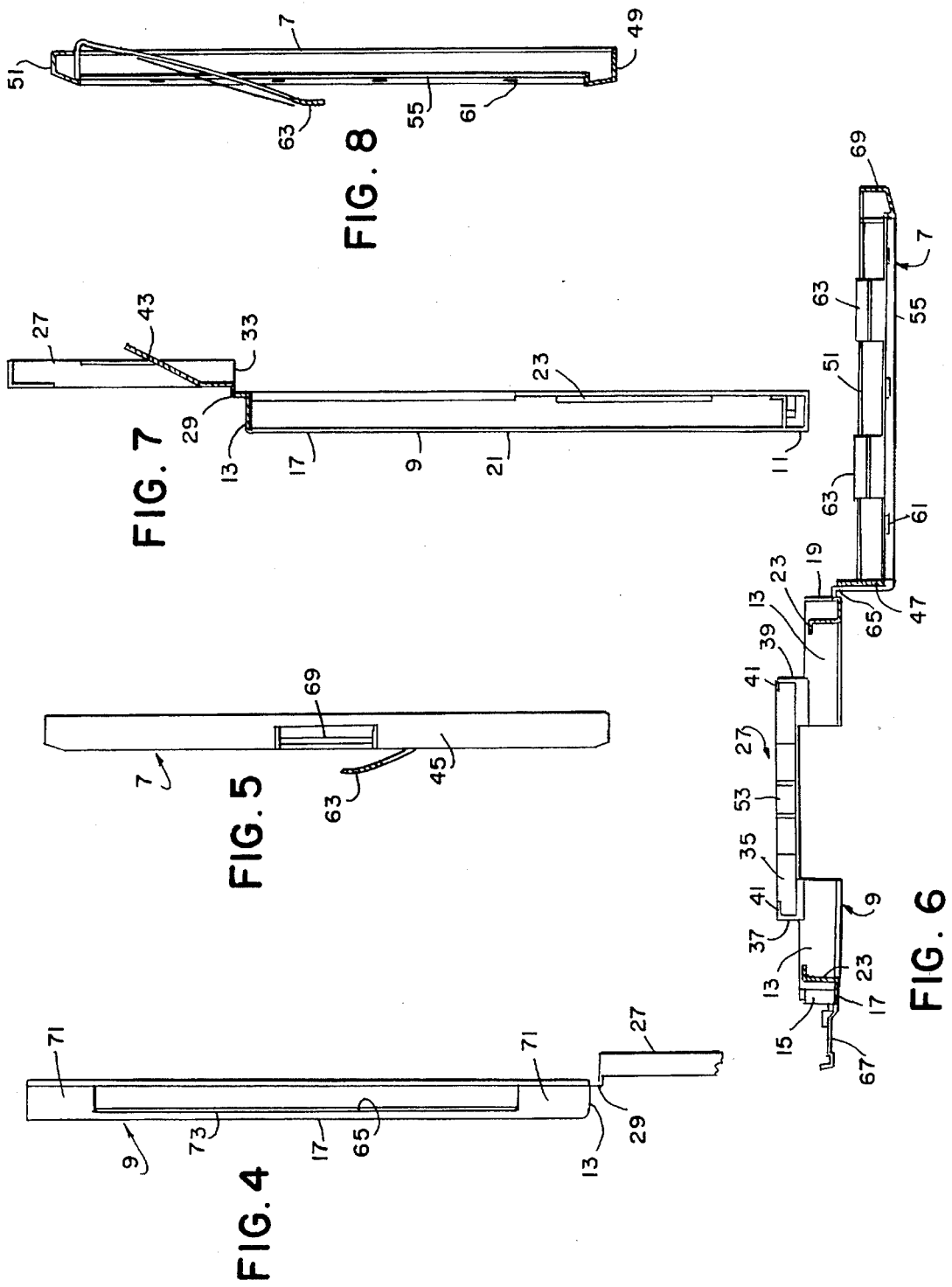

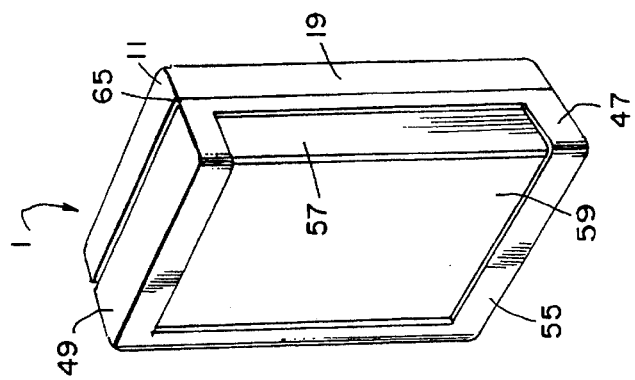
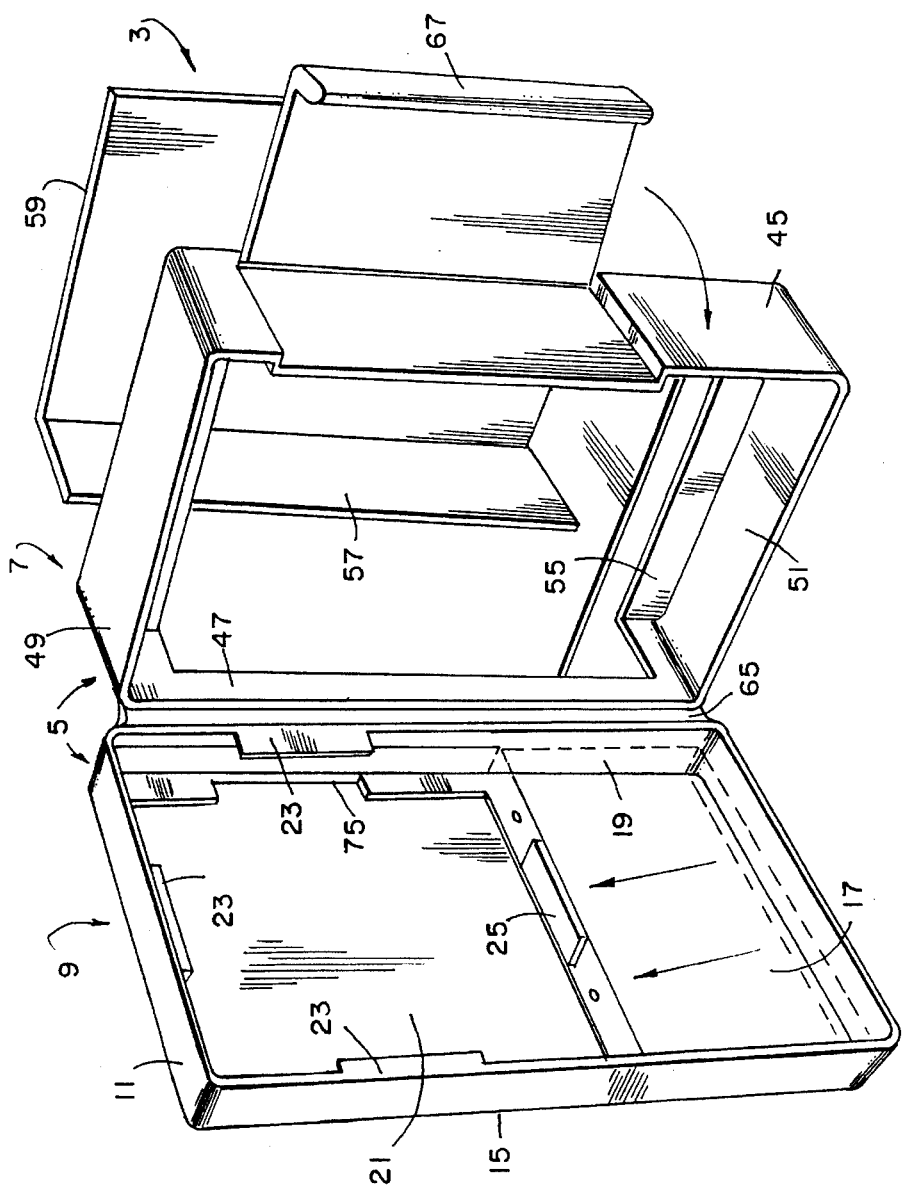

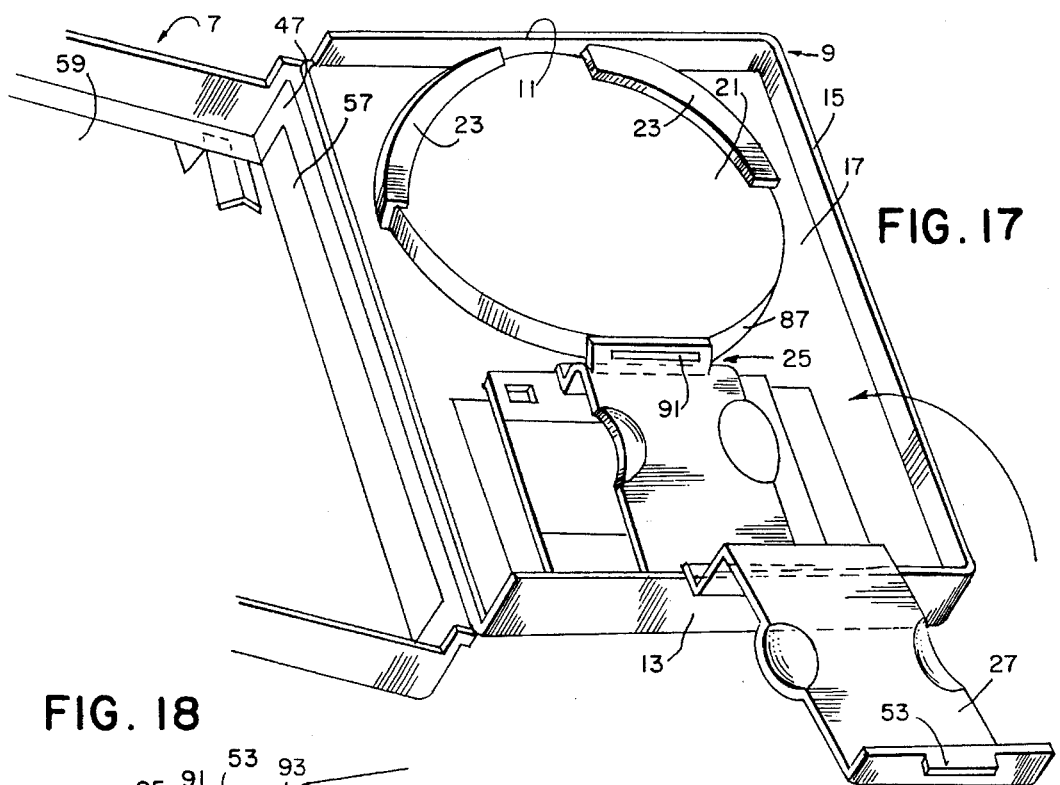
FIG. 17
FIG. 18
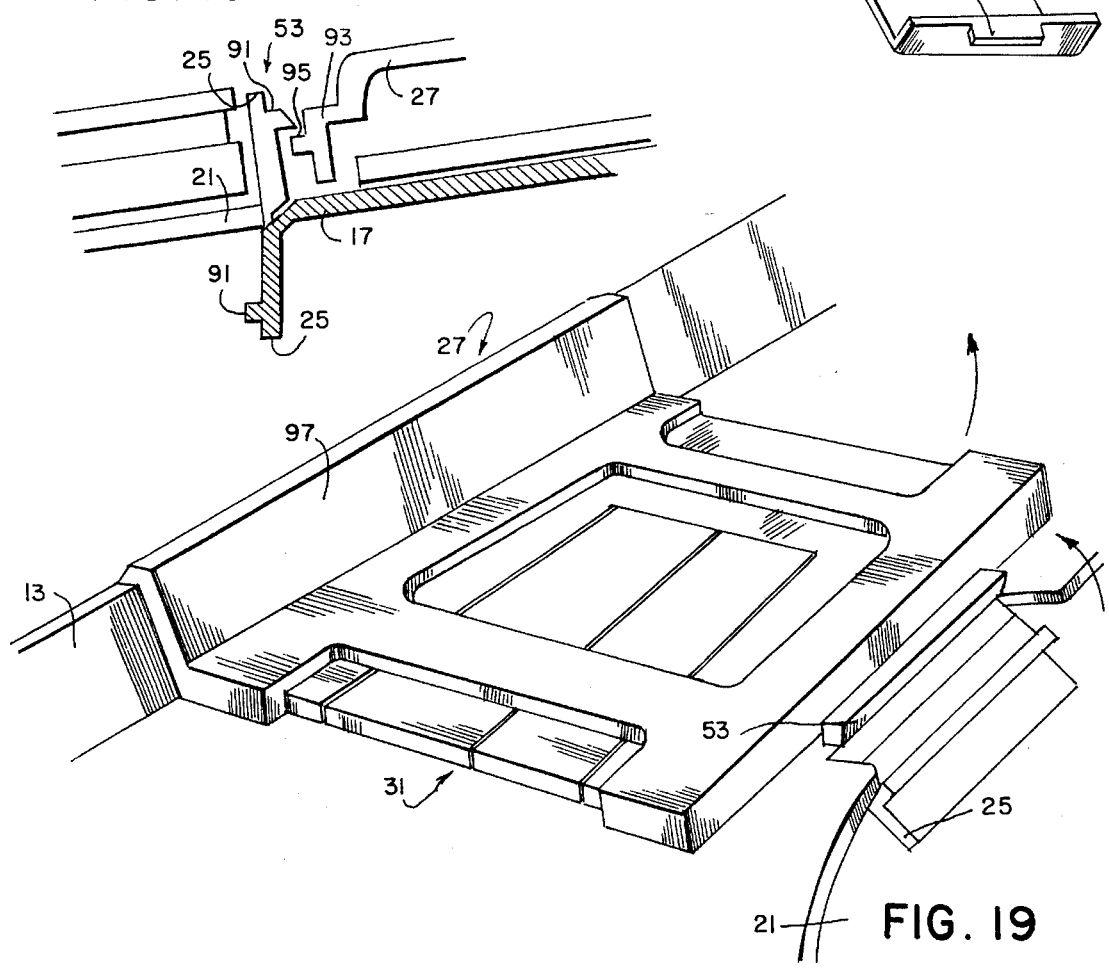
FIG. 19

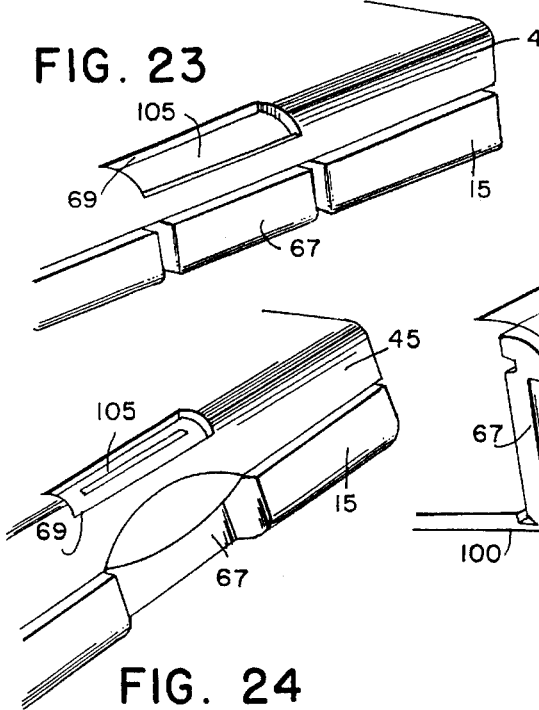
FIG. 23
FIG. 24
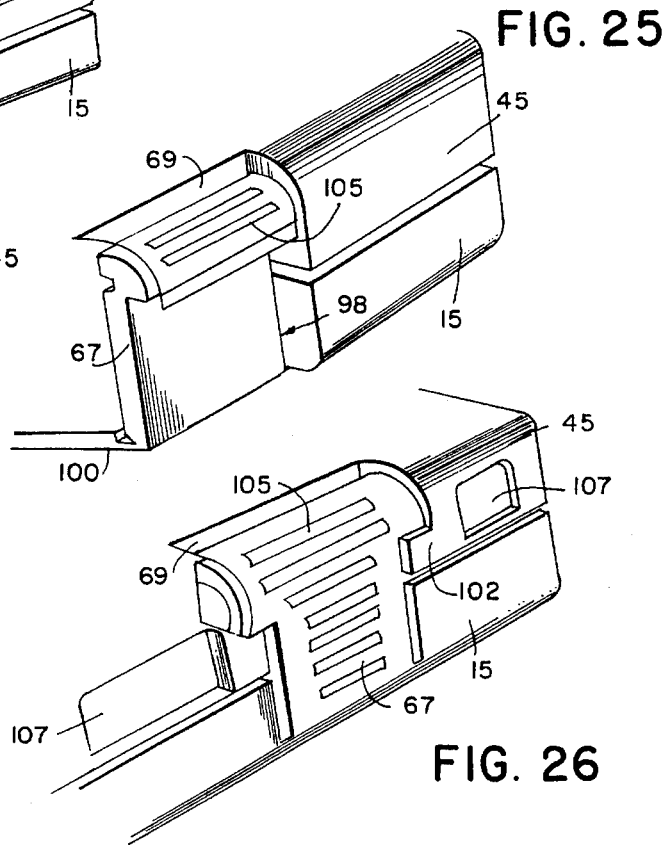
FIG. 25
FIG. 26
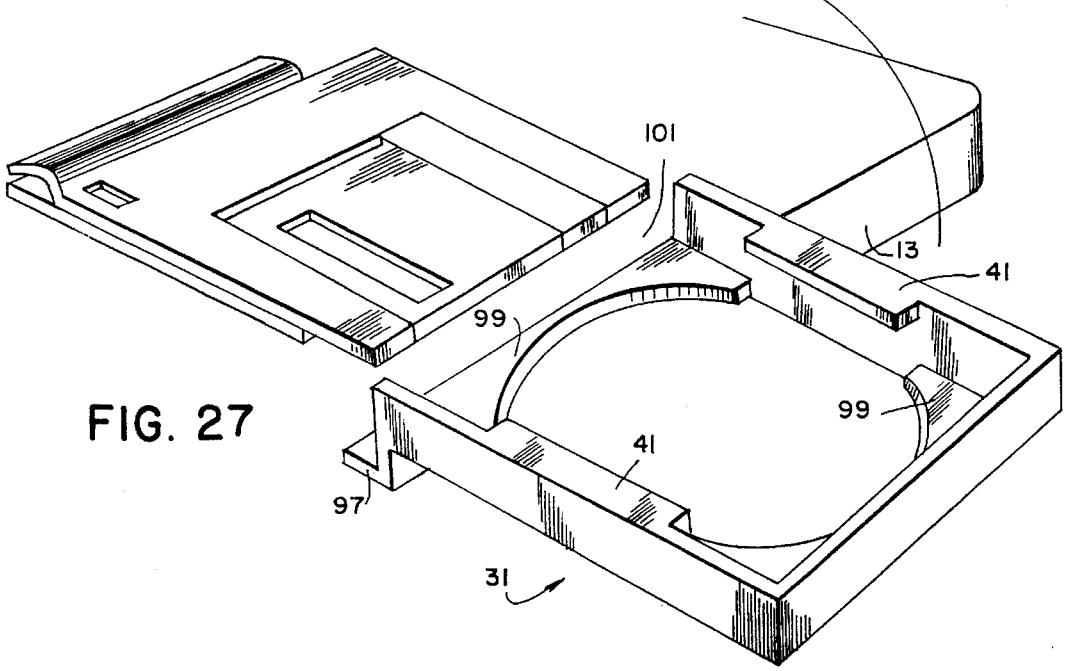
FIG. 27

CD-ROM RETAILER

BACKGROUND OF THE INVENTION

The present invention relates generally to packaging compact discs, 3.5" diskettes and accompanying documentation.

Currently, the packages used to house magnetic and optical media are typically paperboard containers accommodating Jewel boxes or folders having pockets for retaining discs and literature included in the package. Advances in those technologies are needed to meet the needs of manufacturers, merchants and consumers.

Efficient packaging of discs requires that there be some visual recognition of the contents of the package without opening the container. Consumers prefer to see exactly what they are purchasing, rather than to have the product defined by words. A prospective buyer may open a closed package to view its contents. The market value of the product, however, is diminished once the package is opened. Containers holding discs and diskettes are usually shrink wrapped to deter theft and to protect the package from the elements, shipping and other wear and tear. Once the shrink wrap is torn or removed, customers view the product as a used one and are only willing to pay a second hand price. Manufacturers need a method of packaging discs that eliminates the need for shrink wrap and permits customers to inspect the contents before purchase without opening the package.

Compact discs and 3.5" diskettes are easily damaged. Packages are constructed out of paper, and the products housed inside are more likely to be destroyed in transport than when containers are made of a more sturdy material. Physical elements, such as rain, along with carelessness in packaging, in packing, or in transportation cause paper packages to bend, crease, crush or disassemble and risk damage to the contents. Needs exist for disc containers that are durable and damage and moisture resistant, but also economical so as to not price the product out of the market.

Consumers need packages for storing discs and accompanying literature. Packages that can be used throughout the lifetime of the disc are optimal. A sturdy container that can be easily stored and accessed increases the life expectancy of a disc, since incidences of scratches and other physical deformations are limited. Consumers need packages that will not open unexpectedly. Once opened, the discs and diskettes carried inside need to remain in place, even if the package is dropped or awkwardly positioned. Optimal designs would have package closures and disc retainers that require conscious user effort to release.

Disc technology has also created the need for packaging and storage apparatus for discs and all accompanying graphics, labels and literature. The consumer needs to have all the information available at a remote location that he would have in his home or office, such as warranty and registration cards and instruction manuals.

The storage container should be easily transportable. Packages need to be securely stackable on each other so manufacturers can easily position the containers on pallets for delivery and retailers can create displays that are not effortlessly toppled.

Present trends demand that manufacturers develop and use environmentally friendly packaging. Packages need to be constructed of recyclable materials and have interchangeable and replaceable parts so resources are not wasted.

While addressing the packaging needs of manufacturers, retailers and consumers, economics must be considered. Lifetime packages are not cost efficient if limited numbers of products are purchased because of the high costs. Costs can remain steady while increasing quality of the packaging by incorporating the packaging of the individual components into the complete container. Needs exist for containers that maximize potential such that the repetition of features is limited, the number of individual parts is minimized, and the parts of every container are interchangeable.

SUMMARY OF TEE INVENTION

The present invention is a plastic package for selling at retail compact discs and accompanying 3.5" diskettes and other documentation. The package is designed to open like a book and to enable the consumer to browse through the reading material accompanying the compact disc and diskette. The dimensions of the invention correspond to those of standard books, and the container can be displayed and stored vertically on a shelf with other books and software packages. The present invention allows for easy recognition of the package's contents, is economically efficient, and provides protection to the disc both before and after the container is opened.

The retailer, which is the present invention, has two pieces, a frame and a window. The frame is a single structure consisting of two parts, a tray and a cover, connected by a living hinge. The window is made of clear plastic, designed in the shape of an "L," and mechanically fastened to an opening in the cover. Wrapping around the top and the spine of the cover, the window entraps an L-shaped card that serves as the front cover and spine graphics. The L-shaped card can be seen from the inside of the cover, thereby providing more graphic area. A distinct advantage of that structure is the ability to remove the L-shaped card and add a new one, making the package reusable before it is purchased. The cover, in addition to carrying the graphics card, has a flexible arm molded to the inside top of the cover for retaining printed material included in the package.

The tray of the frame has means for holding and securing a compact disc and 3.5" diskettes. The retailer is designed to retain any standard CD case, such as a CD Jewel box. With the frame open, the CD case is placed into the bottom of the tray and is slid up between the containing ribs. Once in place, the CD case can be seen from the back of the package through a rectangular opening in the base of the tray. That visual recognition prevents customer confusion, as consumers will clearly see it is a compact disc they are purchasing. Manufacturers and merchants will decrease losses that result from products opened but not purchased. Merchants and purchasers can inspect packages before sale and may prevent customer dissatisfaction that occurs when purchasers return goods for being damaged or incomplete. Immediate notice of stolen or missing discs is also made available by the present invention.

The graphics on the CD case are visible through the opening and seen from the outside of the package. That facilitates consumer identification and lowers costs, as graphics do not have to be recreated on the retailer.

The retailer has a diskette holder positioned on the tray underneath the CD case containing means. The diskette holder can be a rectangular structure designed to hold one or more diskettes. A living hinge connects the holder to the tray, such that the holder can be flipped out of or into the tray. The diskettes can be placed in or removed from the holder only when the holder is in the open position. A spring, built into the holder, keeps the diskettes from sliding out when the holder is being flipped open and keeps one diskette in place. An opening is configured in the holder such that a standard 3.5" diskette label is visible when the holder is in its locked position.

At the bottom edge of the rectangular opening in the tray is positioned a latch tab. After the CD Jewel box is slid into place, when the base of the tray is deflected out, the latch tab can be folded up at right angles to the base. The latch forms a shelf to hold the Jewel box in place and becomes a gripper for the holder, thereby enabling the 3.5" diskette holder, when flipped into the tray, to be secured down. A flexing arm in a side wall of the 3.5" diskette holder snaps into the latch tab. To remove a compact disc or 3.5" diskette, a coin or screwdriver must be used to pry the latch tab open. To release the CD case, the latch tab must be folded back down in its flat position.

The cover and tray of the frame are held together with a clasp/latch closure. That closure is molded as part of the tray. The latch is molded flat out, in line with the cover and the tray. During manufacturing the latch is flipped up at a 90 degree angle to the base of the tray. The latch is retained in that position with snaps on the side walls of the tray. The snaps leave the latch free to flex further inward but prevent the latch from flexing outward beyond the tray walls. The latch can be placed under spring pressure such that when the latch is flexed inward the latch will return to its 90 degree position. That spring action can be accomplished in two ways. One option is to create a hinge that will bend only up to 90 degrees. A second option involves molding onto the tray or the latch a spring arm that is put between the latch and the wall that retains the CD case. Either option creates an active latch for locking the cover to the tray. Opening the retailer requires a user to push the top or side of the latch inward, thereby releasing the cover.

The tray of the frame can have stacking ribs positioned on the outside of the base. That is an advantage to manufacturers and merchants as the retailers can be stacked securely on each other.

Unlike standard packages, the present invention has strong durability and rigidity. The plastic tray and cover, along with the latches and retaining means, prevent the disc from being bent or scratched during shipping or during observation and removal from the package. The plastic case adds value to an otherwise soft and inexpensive package and gives the consumer a permanent storage container for the home and office.

In terms of economics, the present invention is cost efficient. The frame is one structure having multiple parts molded together. The base window opening design uses the Jewel box cover as the protective covering for graphics and the disc. The ease of disassembly and separation of the graphics card from the cover makes the retailer attractive from reuse and recycling perspectives.

These and further and other objects and features of the invention are apparent in the disclosure, which includes the above and ongoing written specification, with the claims and the drawings.

BRIEF DESCRIPTION OF THE DRAWINGS

FIG. 1 is an embodiment of the CD-Rom retailer having a base, a cover, a retaining arm, a closure latch, and means for capturing and locking a Jewel box and 3.5" diskettes to the base.

FIG. 2 is another embodiment of the present invention having a base, a cover, a retaining arm, a closure latch, and means for capturing and locking a Jewel box and 3.5" diskettes.

FIG. 3 is a cross-sectional illustration of the cover taken along line F—F in FIG. 2.

FIG. 4 is a cross-sectional illustration of the tray taken along line D—D in FIG. 2.

FIG. 5 is a side view of the cover of the retailer.

FIG. 6 is a cross-sectional illustration of the retailer taken along line A—A in FIG. 1.

FIG. 7 is a cross-sectional illustration of the tray taken along line E—E in FIG. 1.

FIG. 8 is a cross-sectional illustration of the cover taken along line C—C in FIG. 1.

FIG. 9 shows an embodiment of the present invention having a tray with means for securing a Jewel box, a cover fitted with a L-shaped window, and a closure latch on the cover.

FIG. 10 shows the embodiment of FIG. 9 when the container is closed.

FIG. 17 shows a preferred embodiment of the tray having a compact disc holding means, a retaining arm for securing 3.5" diskettes, and a flap for preventing disc movement and for holding down the arm.

FIG. 18 shows the flap holding the CD and the retaining arm.

FIG. 19 shows one preferred embodiment of the present invention having a retaining arm for securing 3.5" diskettes with a latch that latches onto the disc retaining flap.

FIG. 23 shows one embodiment of the closure latch for securing the tray to the cover.

FIG. 24 shows a second embodiment of the closure latch for securing the tray to the cover.

FIG. 25 shows a third embodiment of the closure latch for securing the tray to the cover.

FIG. 26 shows a fourth embodiment of the closure latch for securing the tray to the cover.

FIG. 27 shows the inserting of diskettes in a preferred embodiment of a retaining arm for holding the 3.5" diskettes.

DETAILED DESCRIPTION OF THE PREFERRED EMBODIMENTS

Figure 11B:
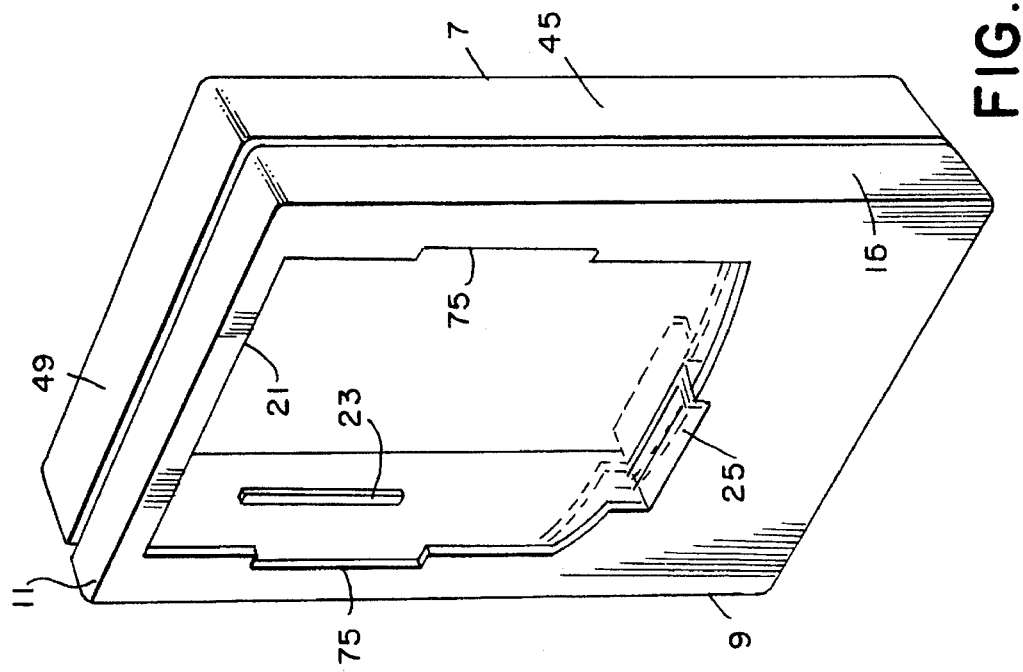
FIGS. 11A and 11B describe how to flip the latch into place by flexing the base of the tray.

Referring to the drawings, FIGS. 1 and 2 show a preferred embodiment of the retailer 1 in an open position. The retailer 1 has two main components, a window 3 and a frame 5. The window 3 is preferably made of a clear plastic to allow for external inspection of the package contents. The frame 5, which can be made of translucent, opaque or clear plastic, has two parts, a cover 7 and a tray 9. The tray 9 is rectangular in shape and has a top wall 11, a bottom wall 13, a free wall 15, and a base 17 connected to edges of each wall of the tray 9. A hinge wall 19 may also be included in the tray 9, extending parallel to the free wall 15 and perpendicularly attached to the top wall 11 and bottom wall 13. The base 17 has an opening 21 positioned near the top wall 11. The opening 21 can be a cut out in the base 17 for allowing visual recognition of a Jewel box and graphics. Positioned around the edges of the opening are gripper ribs 23. Preferred embodiments of the present invention 1 have square openings 21 with three gripper ribs 23 spaced from the opening 21 and positioned on walls 11, 15, and 19 around the perimeter of the opening 21. The containing ribs 23 are designed to retain any standard compact disc case. A fourth edge of the opening 21 has a latch flap 25 connected to the base 17 and folded at right angles to the base 17. A CD case or Jewel box can be slid up the base 17 of the tray 9 and can be placed over the opening 21. The gripper ribs 23 secure the case to the tray 9. The latch flap 25 is flipped inward once the case is positioned inside the containing ribs 23, thus preventing the case from sliding downward. The graphics carried by the Jewel box are visible from the outside when the retailer 1 is closed.

A holder 27 for carrying 3.5" diskettes is connected to the tray 9 at the bottom wall 13. Preferred embodiments have the holder 27 connected to the base 17 by a hinge 29 such that the holder 27 can be flipped into and out of the tray 9. One embodiment of the holder 27 has a four-sided carrier 31 having a first side 33 connected to a hinge on the base 17. A second side 35 parallel to the first side 33 has a tab 53. A third side 37 and a fourth side 39 are parallel to each other and are perpendicularly connected to opposite ends of the first side 33 and second side 35. The third side 37 and the fourth side 39 have retainers 41 for holding 3.5" diskettes which rests on walls 40, one of which diskettes is exposed through an orifice 42 in the carrier 31. A diskette retaining arm 43 extends upward from the first side 33 to hold diskettes on walls 40 of the carrier 31. The tab 53 on the second side 35 of the carrier 31 engages the latch flap 25 when the holder 27 extends inward over the base 17 of the tray 9, thus securing the holder 27 over the base 17.

The cover 7 of the retailer 1 has a rectangular shape with dimensions similar to those of the tray 9. The cover 7 has an outer side 45, an inner side 47, an upper side 49, a lower side 51, and a ledge 55 connected to the edges of the sides. The window 3 is positioned in a cavity 56 in the cover 7. Preferred embodiments of the retailer 1 have an L shaped window 3 having a narrow portion 7 that serves as part of the right side 47 of the cover 7 and a wide portion 59 that fits in the ledge 55 of the cover 7, as shown in FIG. 9. The window 3 is mechanically secured to the cover 7. One means for mechanically fastening the window 3 to the cover 7 is by clasps 61 positioned in the cover 7. The window 3 retains graphics and can be easily removed from the cover 7.

Extending from the lower side 51 of the cover 7 is a retaining arm 63. Preferred embodiments of the Retailer 1 have a U-shaped retaining arm 63 for holding booklets, graphics and other documentation.

The tray 9 and the cover 7 are joined by a hinge 65. Preferred embodiments of the invention 1 have a living hinge 65 connecting the hinge wall 19 of the tray 9 to the inner side 47 of the cover 7. If the tray 9 does not have a hinge wall 19, the inner side 47 of the cover 7 can be hinged directly to the base 17 of the tray 9.

The tray 9 and the cover 7 of the frame 5 can be secured to each other by a latch 67/aperture 69 connection. Preferred embodiments have a latch 67 connected to the free wall 15 of the tray 9 and an aperture 69 in the outer side 45 of the cover 7. When the tray 9 and the cover 7 are moved toward each other, the latch 67 engages the aperture 69 and holds the retailer 1 in a closed position.

FIG. 3 shows a sectional view of a preferred embodiment of the cover 7 of the retailer 1 shown in FIG. 2. The narrow portion 57 of the window 3 forms part of the inner side 47 of the cover 7. The short portion of the window extends beyond the upper edge of the inner side 47.

FIG. 4 shows a view of the tray 9 of FIG. 2 looking across the tray 9 from the hinge wall 19. The hinge wall 19 has two raised portions 71 and a low recess 73 between the two raised portions 71. The extended portion 76 of the inner side 47 shown in FIG. 3 fits into the recess 73 between the two raised portions 71 of the hinge wall 19. A hinge connection 65 is established between the hinge wall 19 and the inner side 47. FIG. 4 also partially shows the diskette holder 27 hinged to the bottom wall 13 of the tray 9 and flipped outward for loading or removing diskettes from the holder 27.

The retailer 1 of FIG. 2 has an aperture 69 in the outer side 45 of the cover 7, as shown in FIG. 5 without the window 3. That aperture 69 receives a latch 67 shown in FIGS. 1 and 2 on the free wall 15 of the tray 9. The retaining arm 63 positioned in the cover 7 extends inward beyond the sides of the cover 7 to provide sufficient retaining force for documents.

A cross-sectional view of the retailer 1 of FIG. 1 is shown in FIG. 6. The gripper ribs 23 are L-shaped and extend upward from the base 17 of the tray 9. The holder 27, when pivoted out of the tray 9, lies in a plane parallel to the base 17 of the tray 9.

FIG. 7 shows a cross-sectional view of the tray 9 of the retailer 1 of FIG. 1. The holder 27 is hinge connected to the bottom wall 13 of the tray 9 and extends outward from the tray 9. A diskette retaining arm 43 extends upward from the bottom of the holder 27.

FIG. 8 shows a cross-sectional view of the cover 7 of the retailer 1 of FIG. 1 before the window 3 is inserted.

A preferred embodiment of the window retailer 1 is shown in FIGS. 9 and 10. The tray 9 has a base 17, a top wall 11, a bottom wall 13, a hinge wall 19 and a free wall 15. Gripper ribs 23 extend from the edges of the top wall 11, hinge wall 19 and free wall 15. The base 17 is perpendicularly connected to the edges of the four walls and has a cut out opening 21 for external visualization of the Jewel box. The Jewel box can be pushed upward along the base 17 until the Jewel box meets the top wall 11. A latch flap 25 positioned on the base 17 at the bottom of the opening 21 can then be raised for securing the jewel box in that position. The cover 7 has a ledge 55, an outer side 45, an inner side 47, an upper side 49 and a lower side 51. The inner side 47 is U-shaped. The narrow portion 57 of an L-shaped wrap around window 3 is positioned inside the inner side 47, thus completing the inner side 47. The ledge 55 is U-shaped, opening toward the inner side 45. The wide portion 59 of the window 3 is positioned within the ledge 55. When the retailer 1 is closed, graphics are displayed through the window 3 on the major surface of the cover 7 and along the spine or inner side 47. The present invention 1 can be stored and displayed vertically on a shelf much like a book. Functionally, the retailer 1 opens as a book and enables the user to page through documentation and reading material accompanying the compact disc and 3.5" diskettes.

Figure 11A:
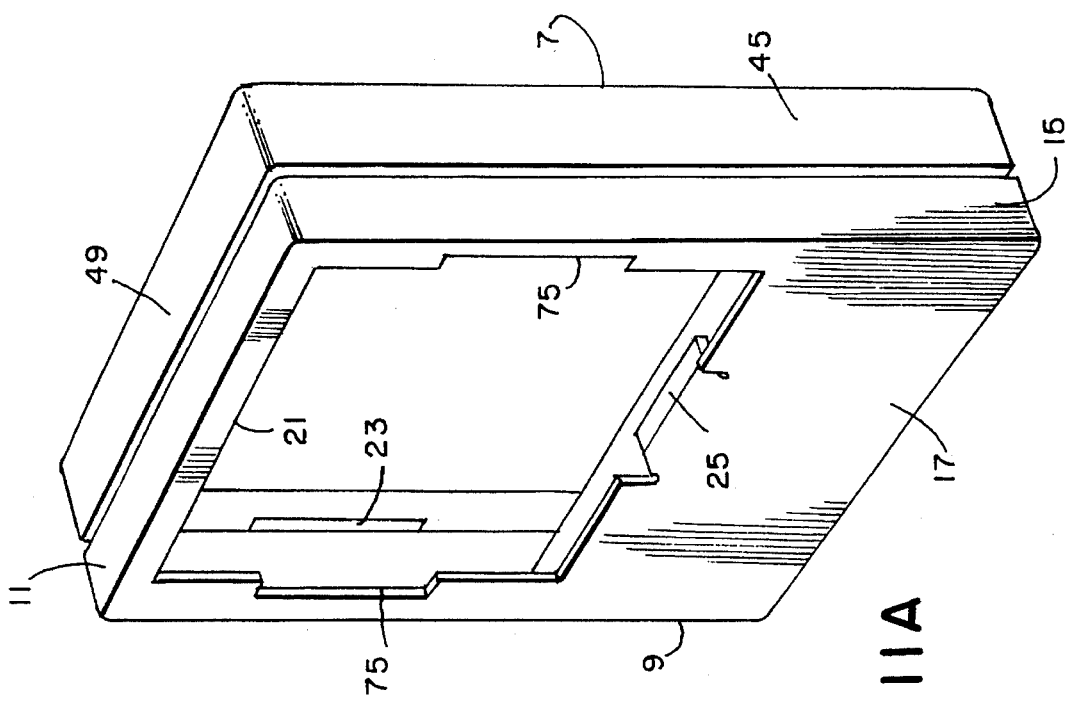
Figure 13:
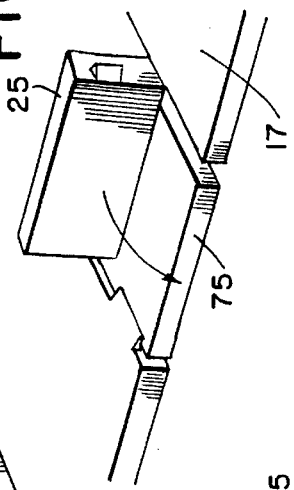
FIG. 13 shows how the flap in FIG. 12 can rotate upward from its downward-formed position for preventing the jewel box from sliding out of the tray.
Figure 12:
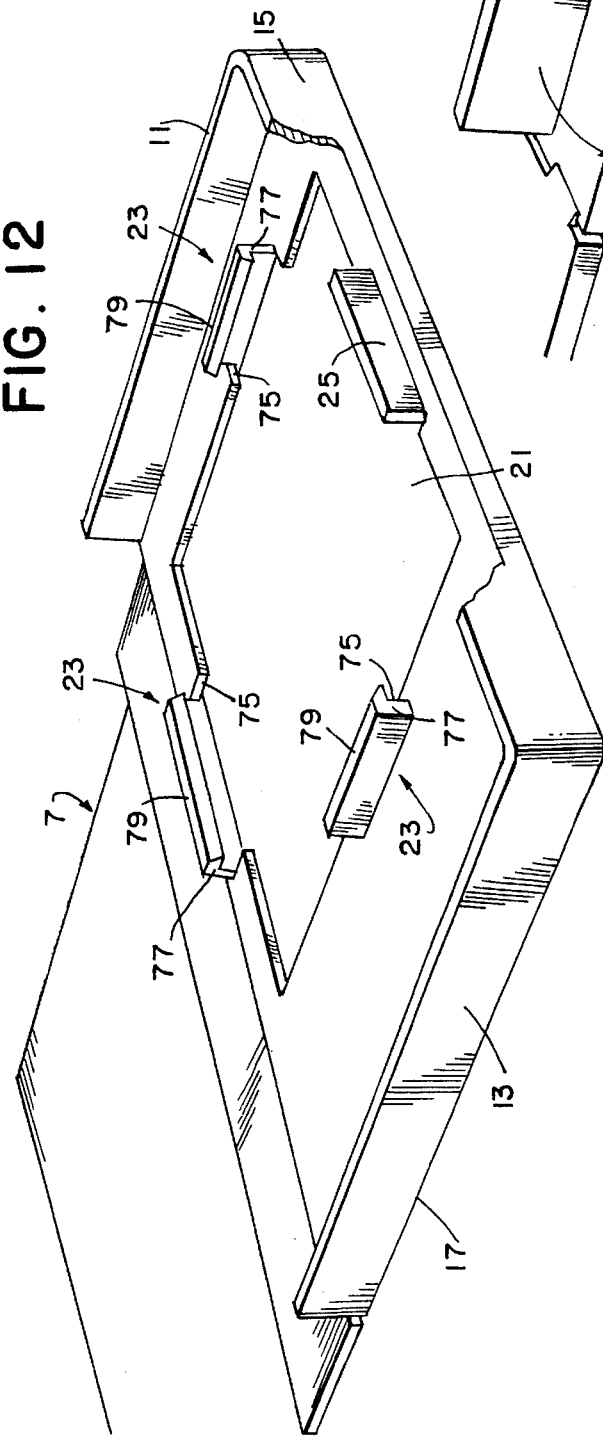
FIG. 12 shows a means for securing a jewel box to the tray using three grippers and a flap.
Figure 14:
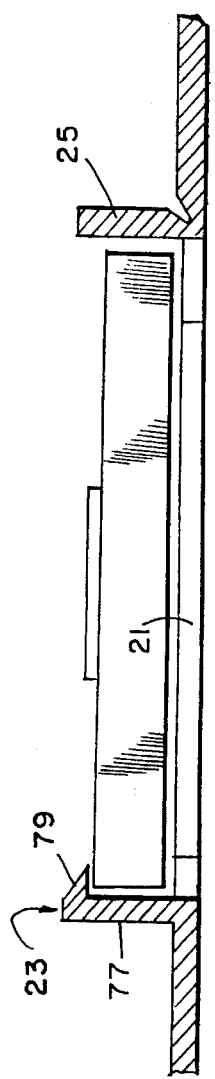
FIG. 14 is a cross-sectional view of the embodiment in FIG. 12 showing how the flap restricts Jewel box movement.

FIGS. 11A and 11B respectively show a latch flap 25 in an inward operational position and a base 17 being flexed to rotate the latch flap 25. FIGS. 12–14 show one preferred embodiment of the tray 9 having gripper ribs 23 and a latch flap 25 near side 15. The base 17 of the tray 9 has a square opening 21 with indentations 75 in each side of the square opening 21 where gripper ribs 23 are formed. The gripper ribs 23 are L-shaped, having a first piece 77 extending perpendicular to the base 17, and a second piece 79, perpendicular to the first piece 77 and extending over the opening 21. While any number of gripper ribs 23 may be used, preferred embodiments have three gripper ribs 23, with one gripper rib 23 positioned on each of three sides of the opening 21. The fourth side of the opening 21 has a latch flap 25 positioned on the base 17 instead of a gripper rib 23. The latch flap 25, when perpendicular to the base 17, prevents a Jewel box placed along the base 17 over the opening 21 from sliding out of the gripper ribs 23. When a Jewel box is in the tray 9, the base 17 can be flexed outward and the latch flap 25 turned outward along the base 17, releasing the Jewel box.

Figure 15:
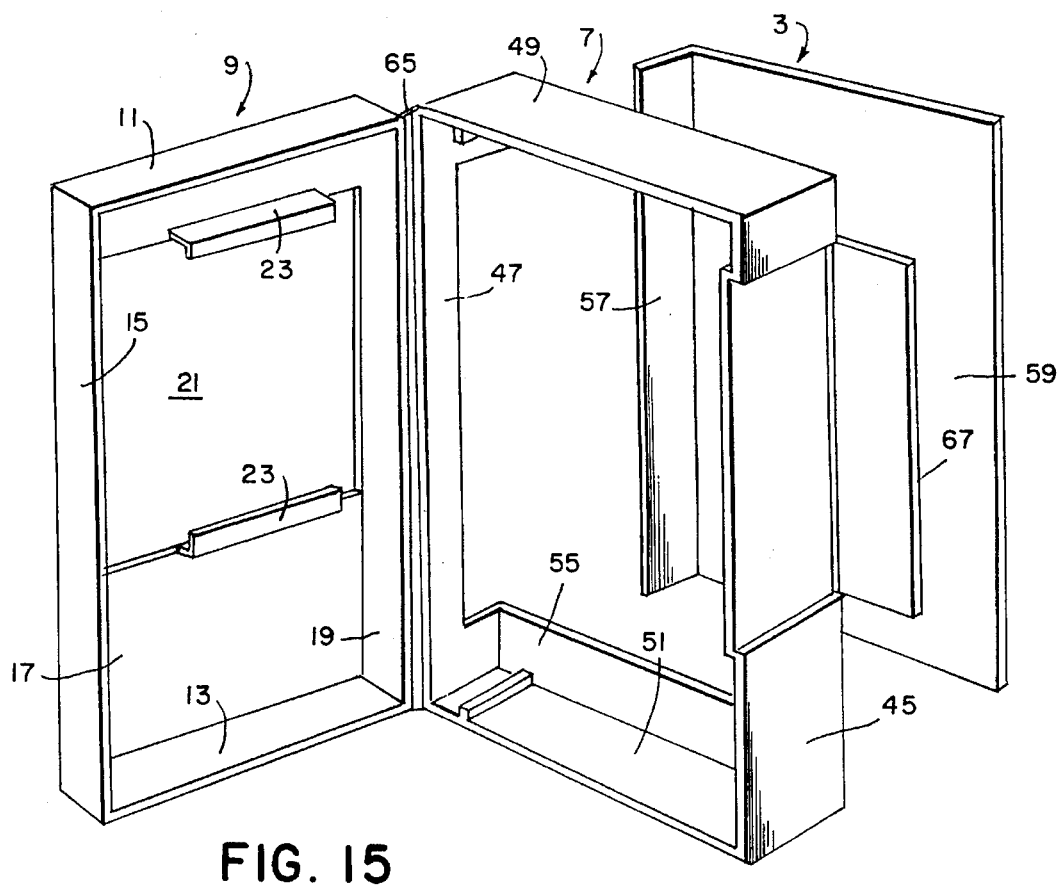
FIG. 15 shows a clear, L-shaped window for carrying a card positioned in the cover of the frame.

Another embodiment of the present invention 1 is shown in FIG. 15. A clear, L-shaped window 3 carrying or trapping an L-shaped graphics card is positioned in the cover 7 of the frame 5. The window 3 is mechanically fastened to the frame 5. A graphics card can be mounted from the outside or inside. Using an L-shaped window 3, only one card is needed for both the spine and cover graphics. A pair of gripper ribs 23 are positioned on the base 17 of the tray 9 for securing a Jewel box to the base 17.

Figure 16:
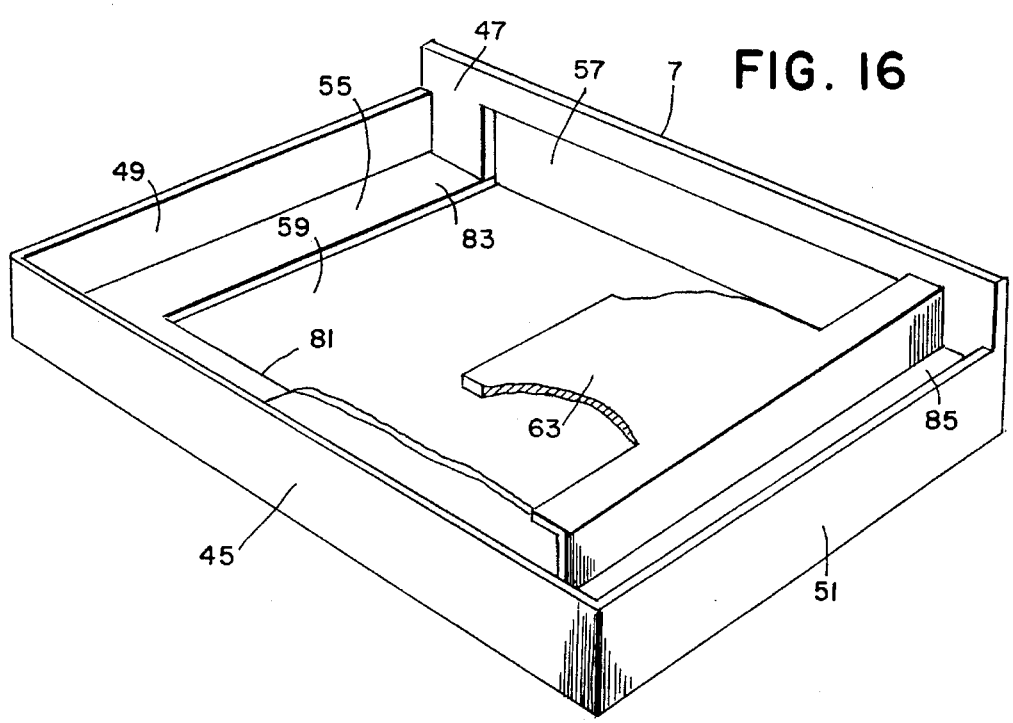
FIG. 16 shows a preferred embodiment of the cover of the present invention having a flexible arm positioned on the inside of the cover for retaining documentation, booklets and written information.

FIG. 16 shows a preferred embodiment for the cover 7 of the retailer 1. The cover 7 has a outer side 45, a inner side 47, an upper side 49, a lower side 51 and a ledge 55. The ledge 55 is U-shaped, having a first portion 81 perpendicularly connected to the outer side 45 and extending the entire length of the outer side 45. A second portion 83 is perpendicularly connected to the first portion 81 and extends along the entire length of the upper side 49. A third portion 85 perpendicularly connects to the first portion 81 and extends along the entire length of the lower side 51. The inner side 47 is also U-shaped. The L-shaped window 3 is positioned against the ledge 55 and the inner side 47 of the cover 7. A flexible retaining arm 63 is molded on the ledge 55 of the cover 7 and extends over the window 3. If the graphic card is left out of the window 3, the booklet graphics held by the flexible retaining arm 63 are used as cover graphics.

FIG. 17 shows an embodiment of a tray 9 for the retailer 1. The tray 9 has a base 17, a free wall 15, a top wall 11 and a bottom wall 13. The outer side 47 of the cover 7 is hinged to the base 17 and serves as the hinge wall 19 when the retailer 1 is in a closed position. The disc retaining means receives a disc, not a Jewel box. A circular opening 21 fitted with a plastic lid 87 is positioned in the base 17. A pair of curved gripper ribs 23 extend from the top of the base 17 around the upper edge of the circular opening 21. A latch flap 25 is hinged to the base 17 at the lower edge of the circular opening 21. In its perpendicular position, the latch flap 25 holds a compact disc. A holder 27 for securing 3.5" diskettes to the base 17 of the tray 9 is hingedly connected to the bottom wall 13 or the base 17 such that the holder 27 can rotate in or out of the tray 9. For securing the diskettes, the latch flap 25 is extended perpendicular to the base 17 of the tray 9. The holder 27 is rotated inward toward the base 17. A tab 53 on the outer end of the holder 27 engages an outward extension 91 of the latch flap 25. That connection prevents the holder 27 from rotating and releasing the diskettes.

FIG. 18 shows a detail of the connection described in FIG. 17. The tab 53 of the holder 27 has an L-shaped body 93 and a short stub 95 extending from the middle of the body 95. When the holder 27 is pushed down onto the base 17, the stub 95 of the tab 53 overrides the extension 91 and rests underneath the extension 91 of the latch flap 25, thus restricting the diskette retaining arm of the holder 27 from moving upward. Extension 91 and stub 95 are separated with a coin, key or screwdriver. When diskettes are removed from the retailer 1, the latch flap 25 rotates out of the base 17, alerting storekeepers and consumers of possible theft.

One detail of a holder 27 for 3.5" diskettes is shown in FIG. 19. The holder 27 has a first part 97 that is hingedly connected to the bottom wall 13 of the tray 9. Connected to the first part 97 is a diskette carrier 31. Preferred embodiments of the carrier 31 hold one or more diskettes and allow visual inspection of the diskette labels before removal. The holder 27 can be rotated out of the tray 9. Preferred embodiments of the retailer 1 allow diskettes to be put in or taken out only when the holder 27 is flipped outward. A spring can be built into the carrier 31 for keeping diskettes from sliding out of the carrier 31 when the holder 27 is flipped open and for retaining one diskette in place. A tab 53 is positioned on the carrier for engaging a latch flap 25.

Figure 20:
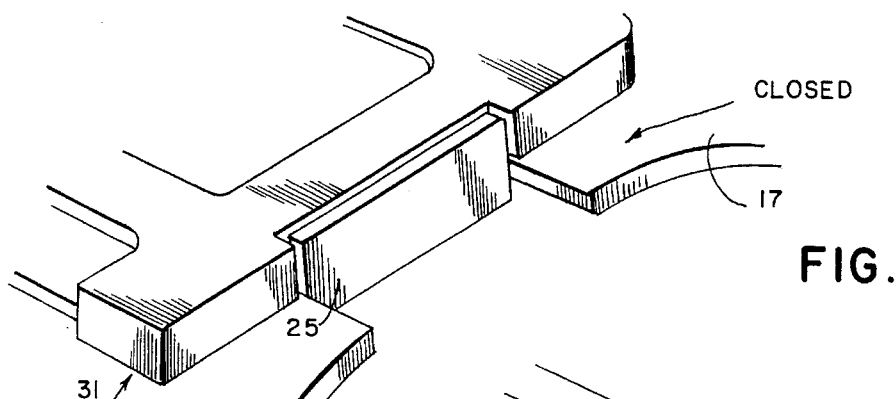
FIG. 20 shows the retaining flap in a closed position securing the retaining arm.
Figure 21:
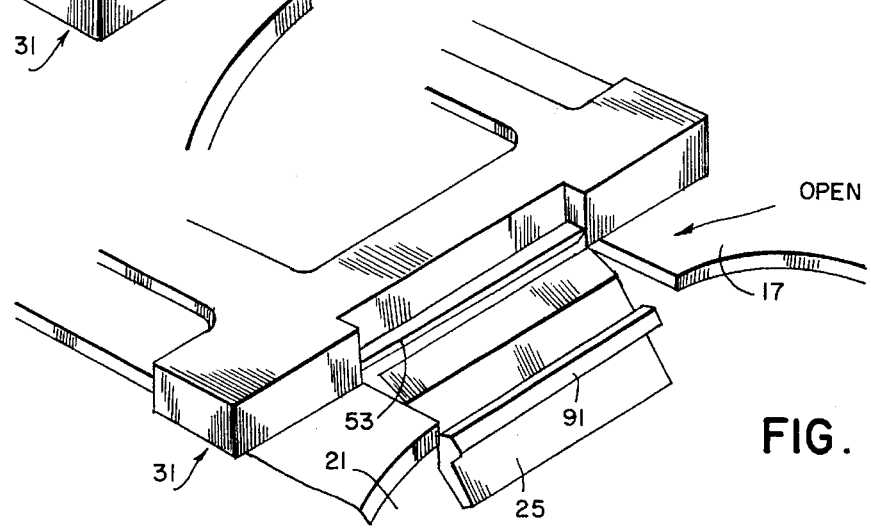
FIG. 21 shows the embodiment of FIG. 20 in an open position, with the retaining flap extending below the tray.

FIGS. 20 and 21 show details of the latch flap 25/tab 53 connection for preferred holders 27. The latch flap 25 extends perpendicular to the base 17 of the tray 9. A tab 53, extending from the carrier 31, rests under the extension 91 on the latch flap 25. A tight connection is established that can only be forcibly opened, such as pried open by a coin or screwdriver. That locks the diskettes and the CD case positioned above the latch flap 25 in place, and reduces the possibility of undesired diskette and disc release. Once pried open, the latch flap 25 rotates on its hinge out of the tray 9, thereby alerting storekeepers and users of the disengaged lock.

Figure 22:
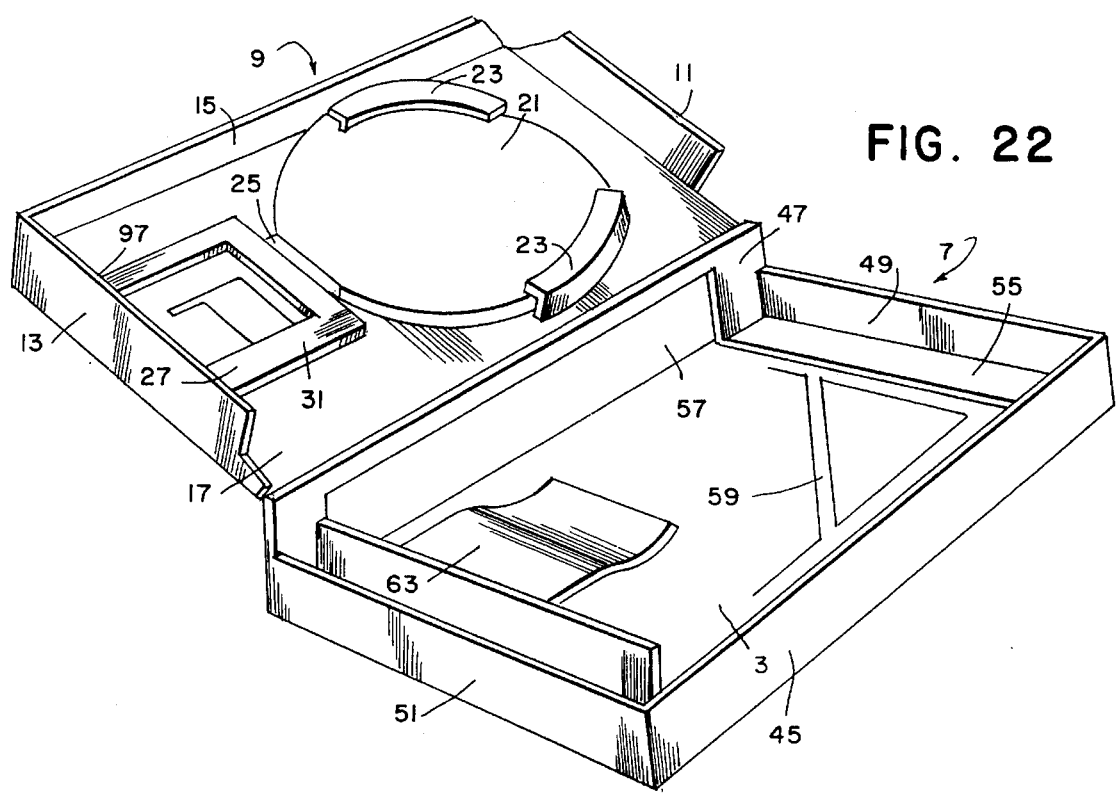
FIG. 22 shows the preferred embodiment of the CD-Rom retailer having a cover fitted with an L-shaped window and a flexible arm, and a tray having a CD wafer securing means, a retaining arm for securing diskettes, and a latch flap.

FIG. 22 illustrates one embodiment of the retailer 1. The tray 9 has a base 17, a top wall 11, a bottom wall 13, and a free wall 15. The tray 9 has a circular opening 21 for displaying a compact disc. Circular gripper ribs 23 extend from the base 17 for securing the disc to the tray 9. A diskette holder 27 is hinged at the bottom of the tray 9. A latch flap 25 is positioned on the base 17 between the holder 27 and the circular opening 21. The latch flap 25 locks the holder 27 down and restricts movement of the compact disc. The cover 7 has a ledge 55, a lower side 51, an upper side 49, an outer side 45 and an inner side 47. The inner side 47 extends higher than the other sides and serves as the hinge wall 19 of the tray 9. An L-shaped window 3 is positioned in the cover 7. The narrow portion 57 of the window 3 is fastened to the inner side 47 and the wide portion 59 of the window 3 is fastened to the ledge 55. A flexible retaining arm 63 is molded on the lower side 51.

FIGS. 23–26 show details of latch 67/aperture 69 closures for the retailer 1. The latch 67 is molded as part of the tray 9 flat and in-line with the cover 7 and the tray 9. During manufacturing, the latch 67 is flipped up to 90 degrees to the tray 9. The latch is retained in that position with snaps 98 on the free wall 15 of the tray 9 as shown in FIG. 25. The snaps 98 leave the latch 67 free to flex inward but prevent any further flex outward. Preferred embodiments are active latches 67 operating under spring pressure so that when the latch 67 is flexed inward it will return to the 90 degree position. One option for creating the spring pressure involves creating a hinge 100 that will only bend up to 90 degrees. If the latch 67 is pushed any further, the user will only be flexing and stretching the latch 67 and hinge. A second option is to mold onto the tray 9 or the latch 67 a spring arm 102 as shown in FIG. 26. The arm 102 should be positioned between the latch 67 and the Jewel box.

To close the retailer 1, the tray 9 and the cover 7 are rotated toward each other. As shown in FIGS. 23 and 24, the latch 67 on the free wall 15 of the tray 9 slides into an aperture 69 in the outer side 45 of the cover 7. The latch 67 pushes outward as it extends through the aperture 69. Upon pushing through the aperture 69, the top edge 105 of the latch 67 secures the cover 7 to the tray 9, and does not release the connection until the latch 67 is pushed inward. To open the Retailer 1, the latch 67 must be pushed inward. FIGS. 23–25 show embodiments of the latch 67 where the top edge 105 of the latch must be pushed inward to release the connection. Similarly the side of the latch 67 can be pushed inward for releasing the connection. In FIG. 26, open areas or buttons 107 positioned in the outer side 45 of the cover 7 serve as the releasing means. Pressure exerted inward on the buttons 107 causes the latch 67 to disengage the aperture 69.

One embodiment of a holder 27 is shown in FIG. 27. The holder 27 has a first part 97 that hingedly connects the holder 27 to the tray 9. Connected to the first part 97 is a carrier 31. The carrier 31 has three sides and shelves 99. The shelves 99 are configured around an opening such that a user can see a standard 3.5" diskette label when the holder 27 is locked down. Diskettes are slid beneath retainers 41 which extend from sides for holding the diskettes in the carrier 31 when the holder 27 is flipped outward. The carrier 31 has an open end 101 for easy insertion and removal of diskettes.

As shown in FIG. 2, preferred embodiments of the retailer 1 have stacking ribs 113 on the outside surface of the ledge 55 of the cover 7 and on the outside surface of the base 17 of the tray 9.

Figure 28:
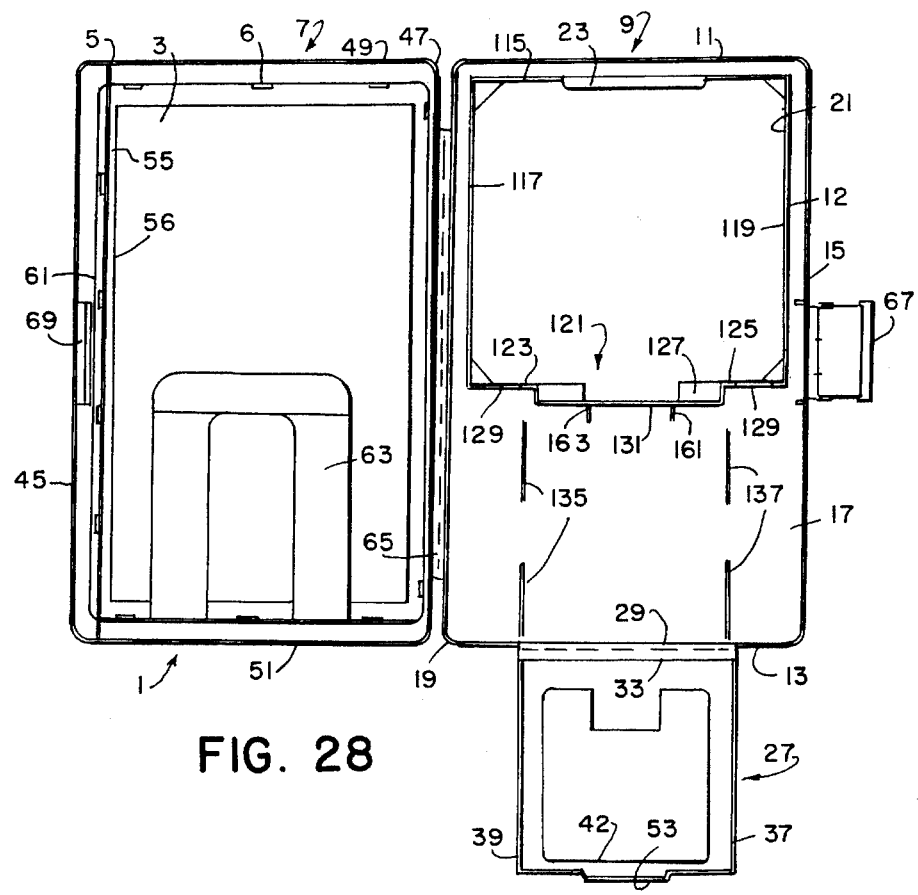
FIG. 28 is another embodiment of the CD-Rom retailer having a base, a cover, a retaining arm, and means for capturing and locking a Jewel box and 3.5" diskettes to the base.
Figure 29:
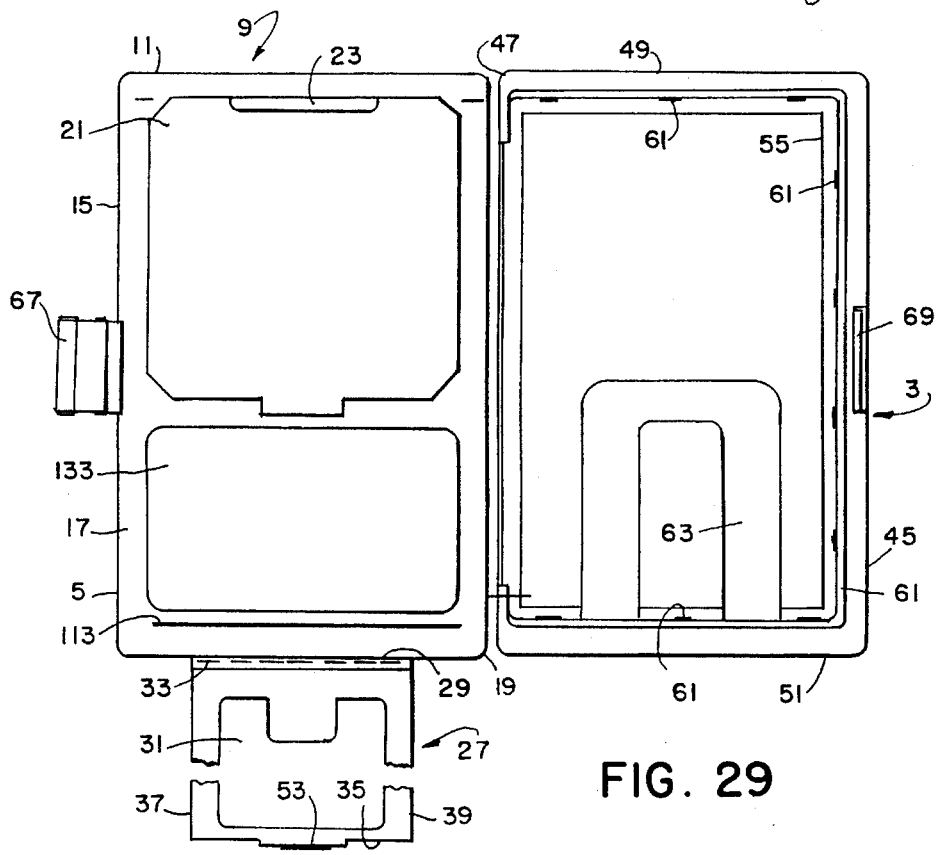
FIG. 29 is an embodiment of the present invention having a base with a diskette opening and a Jewel box opening, a cover, a retaining arm, and means for capturing and locking a Jewel box and 3.5" diskettes.
Figure 30:
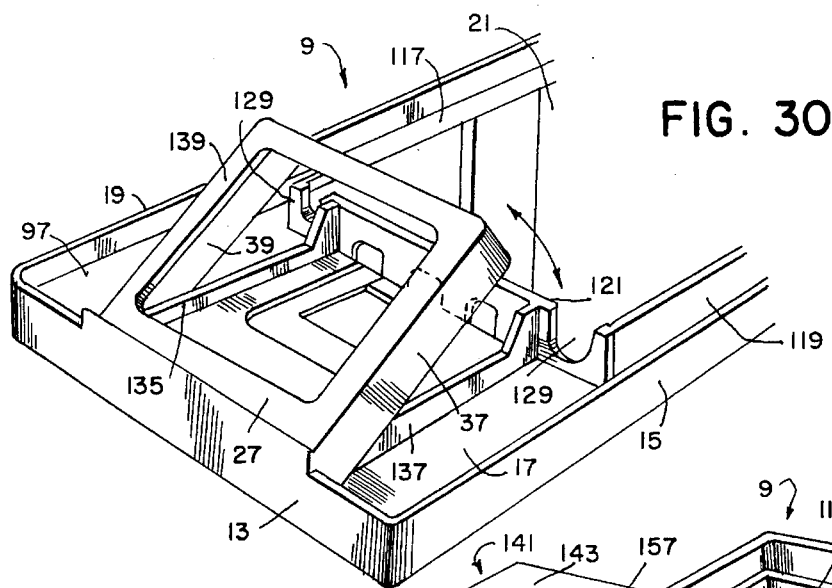
FIG. 30 shows a preferred embodiment of the tray having a hinged holder that retains, but does not carry, the 3.5" diskettes, and a means for securing a Jewel box to the tray, the securing means having notches for facilitating removal of the Jewel box.
Figure 31:
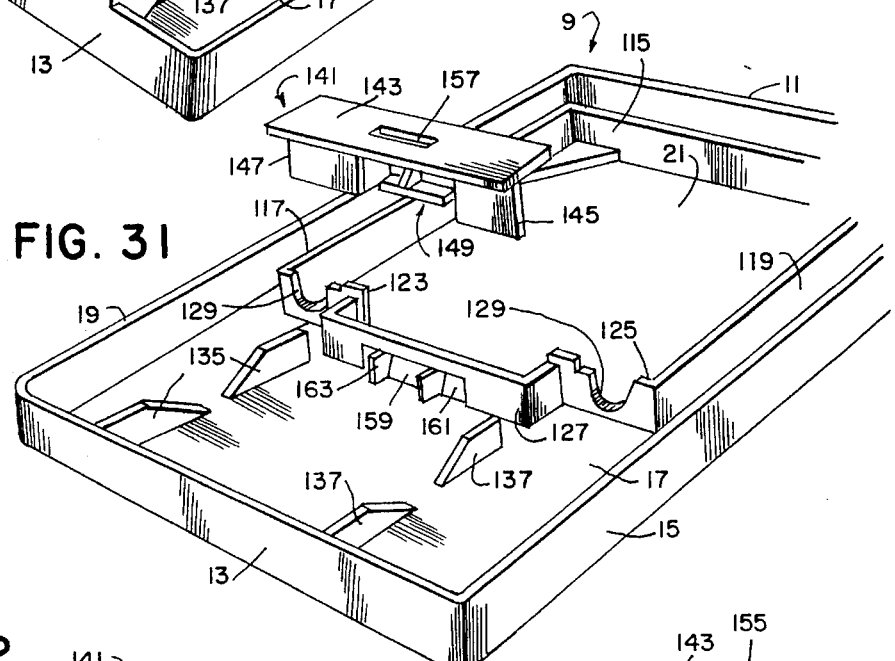
FIG. 31 shows a preferred embodiment of the present invention having a security lock for securing a Jewel box and a 3.5" diskette holder in place.
Figure 32:
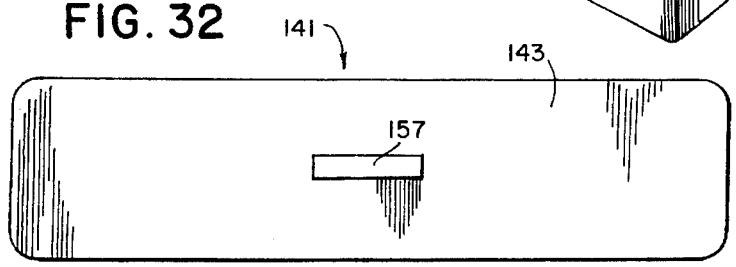
FIG. 32 is a plane view of a preferred embodiment of the security lock.
Figure 34:
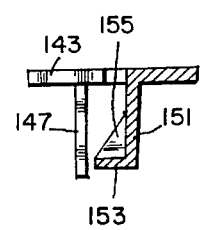
FIG. 34 is a cross-sectional illustration of the security lock along line G—G in FIG. 33.
Figure 33:
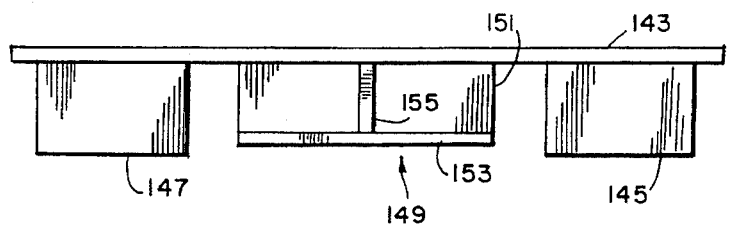
FIG. 33 is a side view of the embodiment of the security lock shown in FIG. 34.

FIGS. 28 and 29 show another embodiment of the CD-Rom retailer 1 in an open position. The base 17 has an opening 21 positioned near the top wall 15 for allowing visual recognition of a Jewel box and graphics. Positioned around all sides of the opening 21 are border walls for retaining a Jewel box on all sides. Preferred embodiments of the tray have a square opening 21 and a top border wall 115, a first border side wall 117, a second border side wall 119, and a lower border wall 121. Preferred embodiments of the border walls have gripper ribs 23 for further containing the Jewel box. The lower border wall 121 has a first segment 123, a second segment 125, and a third segment 127. The first segment 123 extends inward from the first border side wall 117, and the second segment 125 extends inward from the second border side wall 119. The first segment 123 and the second segment 125 have notches 129 for providing access to the Jewel box, as shown in FIGS. 28, 30 and 31. The Jewel box can be pivoted up in the middle for facilitating removal. The third segment 127 preferably is U-shaped and extends between the first segment 123 and the second segment 125. The third segment 127 has a tab receiver 131 for engaging the tab 53 of a holder 27. One embodiment of the invention 1 has a tray 9 with a diskette window 133 in the base 17 for allowing external visual inspection of the diskettes.

The holder 27 can cover, rather than carry, 3.5 inch diskettes. As shown in FIGS. 28 and 30–31, containing walls extend upward from the base 17 of the tray 9. One embodiment has a first containing wall 135 and a second containing wall 137, each containing wall 135, 137 parallel to the free wall 15 of the tray 9 and extending from the bottom wall 13 to the lower border wall 121, as in FIG. 30. In a second embodiment, both the first containing wall 135 and the second containing wall 137 are segmented into two shorter walls, as shown in FIGS. 28 and 31. The containing walls 135, 137 prevent lateral movement of the diskettes. Preferred embodiments of the holder 27 are four sided. A holder 27 is hingedly connected to the bottom wall 13 of the tray 9 at a first side 33. A second side 35 of the holder 27 is parallel to the first side 33 and has a tab 35. A third side 37 and a fourth side 39 are parallel to each other and perpendicularly connected to the first side 33 and second side 35. A diskette ledge 139 extends across the top edges of the sides of the holder 27. By using a holder 27 that covers, rather than carries, the diskettes, the diskettes are oriented correctly, rather than at a 90 degree angle.

One embodiment of the present invention 1 has a frame 5 molded without a holder 27, as in FIG. 31. Containing walls 135, 137 retain the 3.5" diskettes in the tray 9.

FIGS. 31–34 show a preferred embodiment of the retailer 1 having a security lock 141 for fastening the Jewel box and 3.5" diskette holder 27 to the tray 9. The security lock 141 is not molded to the tray 9. Preferred embodiments of the security lock 141 have a cap 143, a first leg 145, a second leg 147, and a clip 149. The first leg 145, the second leg 147, and the clip 149 extend perpendicularly from the cap 143. Preferred embodiments of the clip 149 are L-shaped, having a long part 151, a short part 153, and a triangular part 155. The triangular part 155 is positioned in the middle of the clip 149. The cap 143 has a slit 157 positioned near the connection of the clip 149 to the cap 143.

The security lock 141 is positioned on the tray 9 such that the cap 143 lies parallel to the base 17 and extends over the Jewel box and 3.5" diskettes. The tab receiver 131 of the lower border wall 121 has a gap 159 and two extensions 161, 163. The first leg 145 and the second leg 147 of the security lock 141 engage the outer sides of the extensions 161, 163. The clip 149 rests on the inner side of the lower border wall 121, extends through the gap 159, and is engaged by the inner sides of the extensions 161, 163. To release the security lock 141, a screwdriver is inserted into the slit 157 in the cap 143 and the clip 149 is deflected inward, releasing the clip 149. The underside of the security lock 141 is seen from the base 17 of the frame 5 at the bottom of the Jewel box opening 21. That provides for an easy visual check to confirm that the security lock 141 has not been removed. The security lock 141 works even in the absence of a holder 27.

While the invention has been described with reference to specific embodiments, modifications and variations of the invention may be constructed without departing from the scope of the invention, which is described in the following claims.

We claim:

1. A compact disc container for holding a disc and diskettes comprising a frame and a window, the frame further comprising a tray and a cover connected to the tray by a hinge, the tray having a base and a top wall, a bottom wall, and a free wall extending perpendicularly to each other and outward from the base, an opening in the base, at least two CD edge grippers extending outward from the base near the opening, a flap hingedly connected to the base near the opening for holding a disc in the grippers, the cover having a ledge and an upper side, a lower side, an inner side, and an outer side extending perpendicularly to each other and outward from the ledge, a retaining arm connected to one side of the cover and extending over the cover, a latch and a complementary latch receiver for engaging the latch, mounted oppositely from each other on the frame, and the window being connected to the ledge on the cover for carrying and displaying graphics from within the window in the cover.

2. The apparatus of claim 1 further comprising a diskette holder hingedly connected to the tray below the opening for holding 3.5" diskettes.

3. The apparatus of claim 1, wherein the hinge is a living hinge connecting the inner side of the cover to an edge of the base of the tray.

4. The apparatus of claim 1, wherein the window has a narrow portion and a wide portion, the narrow portion perpendicularly connected to the wide portion, and wherein the narrow portion lies along the inner side, and the wide portion is connected to and lies along with the ledge.

5. The apparatus of claim 4, further comprising a hinge wall extending outward from an inner edge of the base.

6. The apparatus of claim 5, wherein the hinge is a living hinge connecting the hinge wall of the tray to the inner side of the cover.

7. The apparatus of claim 6, wherein the hinge wall has a pair of raised portions and a recess between the raised portions, forming a U-shaped wall and wherein the narrow portion of the window extends further than the inner side, and the narrow portion extends into the recess of the hinge wall.

8. The apparatus of claim 4, wherein the top of the cover is U-shaped, having a first portion perpendicularly connected to the outer side and extending along the outer side, a second portion perpendicularly connected to the first portion and extending along the upper side, and a third portion perpendicularly connected to the first portion and extending along the lower side, and wherein the inner side is U-shaped, opens toward the cover, and is perpendicularly connected to the base of the tray.

9. The apparatus of claim 1, wherein the opening is a rectangular and positioned in the base near the top wall.

10. The apparatus of claim 9, wherein grippers extend from the base near the opening, each gripper having a first piece extending outward from the base and a second piece perpendicularly connected to the first piece and extending over the opening.

11. The apparatus of claim 10, wherein the opening has four borders and wherein containing ribs extend outward from the base near three of the borders, and the flap is connected to the base near a fourth border.

12. The apparatus of claim 11, wherein indentations are formed in the base along the borders of the opening and where the grippers and the latch flap extend from the base near the indentations.

13. The apparatus of claim 1, wherein the opening is circular and the grippers are positioned around the opening for securing a compact disc to the tray.

14. The apparatus of claim 13, further comprising a clear plastic lid positioned over the opening and connected to the base.

15. The apparatus of claim 14, wherein the grippers positioned around the opening are curved.

16. The apparatus of claim 1, further comprising a hinge wall extending outward from an edge of the base, and wherein the grippers are positioned on the hinge wall and the free wall for securing a disc case to the tray.

17. The apparatus of claim 16, wherein the grippers are positioned on the hinge wall, the free wall, and the top wall.

18. The apparatus of claim 1, wherein the retaining arm is flexible and is connected to the ledge of the cover.

19. The apparatus of claim 1, wherein the retaining arm is flexible and is connected to the lower side of the cover.

20. The apparatus of claim 1, wherein the retaining arm is U-shaped and is molded with the tray.

21. The apparatus of claim 1 further comprising a second hinge on the bottom wall of the tray and a diskette holder connected to the tray at the bottom wall by the second hinge allowing for the holder to be folded into and out of the tray.

22. The apparatus of claim 21, wherein the diskette holder is a diskette carrier having a first side connected to the bottom wall by the second hinge, a second side parallel to the first side and having an outward extending tab, and a third side and a fourth side parallel to each other and perpendicularly connected to opposite ends of the first side and the second side.

23. The apparatus of claim 22, further comprising diskette retainers extending inward from sides of the carrier.

24. The apparatus of claim 23, further comprising a diskette retaining arm connected to the second side and extending upward and inward from the second side toward the first side of the carrier.

25. The apparatus of claim 22, wherein the holder has a first part connected to the second hinge that hingedly connects the carrier to the bottom wall, and wherein the carrier has shelves connected to bottom edges of the first side, second side, third side and fourth side.

26. The apparatus of claim 23, further comprising a spring built into the carrier for preventing diskettes from sliding out of the carrier and for retaining one diskette in place.

27. The apparatus of claim 22, wherein the flap is hingedly connected to the base at a lower edge of the opening and above the holder, and the flap has an extension extending perpendicularly from the flap such that when the flap is perpendicular to the base, the extension is parallel to the base.

28. The apparatus of claim 27, further comprising a tab extending from the holder, wherein the tab has a L-shaped body and a short stub extending from the middle of the body, such that when the holder is pushed down onto the base the stub of the tab overrides and rests underneath the extension of the latch flap.

29. The apparatus of claim 1, wherein the latch is molded as part of the tray, flat and in-line with the tray and wherein the latch is retained in a position parallel to the free wall and perpendicular to the base.

30. The apparatus of claim 29, further comprising snaps on the free wall and wherein the latch is retained in the position parallel to the free wall and perpendicular to the base by the snaps on the free wall of the tray.

31. The apparatus of claim 29, wherein the latch operates under spring pressure such that when the latch is flexed inward the latch will return to the original position.

32. The apparatus of claim 31, further comprising a spring arm molded with the base of the tray between the latch and a Jewel box for creating spring pressure.

33. The apparatus of claim 31, wherein a spring arm is molded with the latch for creating spring pressure.

34. The apparatus of claim 29, further comprising an aperture in the free side and wherein the latch has a top edge that extends through the aperture and rests on an edge of the aperture for securing the cover to the tray.

35. The apparatus of claim 29, further comprising buttons positioned in the outer side of the cover for releasing the latch from the latch receiver.

36. The apparatus of claim 1, further comprising stacking ribs positioned on outer surfaces of the base of the tray and the ledge of the cover.

37. The apparatus of claim 1, wherein the frame is a single molded piece made of plastic and the window is made of clear plastic.

38. A package for holding a disc and diskettes comprising a frame and a window, the frame further comprising a tray and a cover connected by a hinge, the tray having a base, a top wall extending outward from a top end of the base, a bottom wall extending outward from a bottom end of the base, a free wall extending outward from a right edge of the base, an opening in the base, at least two grippers extending outward from the base near the opening, a latch flap hingedly connected to the base near the opening, a diskette holder hingedly connected to the tray below the opening for holding 3.5" diskettes, and a latch connected to and extending outward from the free wall of the tray, the cover having a ledge, an upper side extending outward from an upper end of the ledge, a lower side extending outward from a lower end of the ledge, an inner side extending outward from an inner edge of the ledge, an outer side extending outward from an outer edge of the ledge, a retaining arm connected to the cover and extending over the cover, an aperture in the outer side of the cover for engaging the latch, and multiple clasps for mechanically fastening the window to the cover, and the window for carrying graphics positioned in and mechanically fastened to the ledge and the inner side of the cover.

39. The apparatus of claim 38 wherein the hinge is a living hinge connecting the inner side of the cover to a left edge of the base of the tray.

40. The apparatus of claim 38 further comprising a hinge wall extending outward from a left edge of the base.

41. The apparatus of claim 40 wherein the hinge is a living hinge connecting the hinge wall of the tray to the inner side of the cover.

42. A compact disc container for holding a disc and diskettes comprising a frame and a window, the frame further comprising a tray and a cover connected to the tray by a hinge, the tray having a base and a top wall, a bottom wall, and a free wall extending perpendicularly to each other and outward from the base, an opening in the base, the opening surrounded by a first border side wall, a second border side wall, a lower border wall and a top border wall, the cover having a ledge and an upper side, a lower side, an inner side, and an outer side extending perpendicularly to each other and outward from the ledge, a retaining arm connected to one side of the cover and extending over the cover, a latch and a complementary latch receiver for engaging the latch, mounted oppositely from each other on the frame, and the window being connected to the ledge on the cover for carrying and displaying graphics from within the window in the cover.

43. The apparatus of claim 42, wherein the lower border wall has a first segment extending inward from the first border side wall, a second segment extending inward from the second border side wall, and a third segment positioned between and connected to the first segment and the second segment.

44. The apparatus of claim 43, wherein notches are positioned in the first segment and in the second segment for providing access to the Jewel box.

45. The apparatus of claim 42, wherein the third segment is U-shaped and has a gap, a first projection extending outward from the third segment from a first edge of the gap, and a second projection extending outward from a second edge of the gap.

46. The apparatus of claim 45, further comprising a security lock, the security lock having a cap, a first leg extending downward from an underside of the cap, a second leg extending downward from the underside of the cap and parallel to the first leg, and a clip, extending downward from the underside of the cap and positioned between the first leg and the second leg, and wherein the legs engage outer sides of the extensions, the clip extends through the gap of the lower border wall, and the cap extends over a Jewel box and a diskette.

47. The apparatus of claim 46, wherein the clip has a long part extending perpendicularly downward from the underside of the cap, a short part extending perpendicularly from the long part, and a triangular part connected to a middle of the long part and the short part, such that a hypotenuse of the triangular part extends from the long part to the short part.

48. The apparatus of claim 46, wherein the cap has a slit positioned near a connection of the clip to the cap.

49. The apparatus of claim 45, further comprising a holder, the holder having a first side hingedly connected to the bottom wall of the tray, a second side parallel to the first side and having an outward extending tab, a third side and a fourth side parallel to each other and perpendicularly connected to opposite ends of the first side and the second side, and a diskette ledge connected to and extending across the top edges of the first side, the second side, the third side and the fourth side.

50. The apparatus of claim 49, further comprising a security lock, the security lock having a cap, a first leg extending downward from an underside of the cap, a second leg extending downward from the underside of the cap and parallel to the first leg, and a clip, extending downward from the underside of the cap and positioned between the first leg and the second leg, and wherein the legs engage outer sides of the extensions, the clip extends through the gap of the lower border wall, and the cap extends over a Jewel box and the holder.

51. The apparatus of claim 50, wherein the clip has a long part extending perpendicularly downward from the underside of the cap, a short part extending perpendicularly from the long part, and a triangular part connected to a middle of the long part and the short part, such that a hypotenuse of the triangular part extends from the long part to the short part.

52. The apparatus of claim 50, wherein the cap has a slit positioned near a connection of the clip to the cap.

53. The apparatus of claim 42, further comprising gripper ribs extending from the border walls across the opening for securing a Jewel box to the tray.

54. The apparatus of claim 42, further comprising a diskette window in the base for external visual inspection of diskettes.

55. The apparatus of claim 42, further comprising a first containing wall and a second containing wall, the containing walls extending upward from the base parallel to the free wall.

56. The apparatus of claim 55, wherein the first containing wall and the second containing wall extend from the free wall of the tray to a lower border wall, the lower border wall extending upward from the base along a lower edge of the opening.

57. The apparatus of claim 55, wherein the first containing wall and the second containing wall are segmented.

* * * * *